(12) United States Patent
Mao

(10) Patent No.: US 10,639,781 B2
(45) Date of Patent: May 5, 2020

(54) POWER TOOL

(71) Applicant: CHERVON (HK) LIMITED, Wanchai (HK)

(72) Inventor: Guoxing Mao, Nanjing (CN)

(73) Assignee: Chervon (HK) Limited, Wanchai (HK)

( * ) Notice: Subject to any disclaimer, the term of this patent is extended or adjusted under 35 U.S.C. 154(b) by 399 days.

(21) Appl. No.: 15/602,910

(22) Filed: May 23, 2017

(65) Prior Publication Data

US 2017/0355072 A1 Dec. 14, 2017

(30) Foreign Application Priority Data

Jun. 8, 2016 (CN) .......................... 2016 1 0402691
Jun. 8, 2016 (CN) ...................... 2016 2 0553202 U

(51) Int. Cl.
| | |
|---|---|
| *B25F 5/00* | (2006.01) |
| *B25B 21/00* | (2006.01) |
| *F16H 3/66* | (2006.01) |
| *F16H 63/04* | (2006.01) |
| *F16H 63/30* | (2006.01) |

(52) U.S. Cl.
CPC ............ *B25F 5/001* (2013.01); *B25B 21/00* (2013.01); *B25F 5/00* (2013.01); *F16H 3/66* (2013.01); *F16H 63/04* (2013.01); *F16H 63/30* (2013.01); *F16H 2063/3093* (2013.01); *F16H 2200/0034* (2013.01); *F16H 2200/201* (2013.01)

(58) Field of Classification Search
CPC . B25F 5/001; B25B 21/00; F16H 3/66; F16H 63/04; F16H 63/30; F16H 2063/3093; F16H 2200/0034; F16H 2200/201
USPC .................................................. 173/216, 217
See application file for complete search history.

(56) References Cited

U.S. PATENT DOCUMENTS 7,380,613 B2 * 6/2008 Furuta ..................... B25B 21/00
173/178

* cited by examiner

*Primary Examiner* — Michelle Lopez
(74) *Attorney, Agent, or Firm* — Greenberg Traurig, LLP

(57) ABSTRACT

A power tool includes an output shaft for outputting torque, a motor for driving the output shaft to rotate about a first axis, a transmission mechanism for transmitting an output of the motor to the output shaft, a gear box for containing the transmission mechanism, a sleeve for a user to operate so as to adjust a maximum output torque transmitted from the motor to the output shaft, a locating element for limiting an axial position of the sleeve, fastening elements for fixing the locating element to the gear box, and a bearing for supporting the output shaft. The locating element is formed with a containing groove for containing the bearing and locating holes formed on a bottom of the containing groove. The fastening elements are at least partially embedded in the locating holes.

11 Claims, 8 Drawing Sheets

POWER TOOL

RELATED APPLICATION INFORMATION

This application claims the benefit under 35 U.S.C. § 119(a) of Chinese Patent Application No. CN 201610402691.7, filed on Jun. 8, 2016, and Chinese Patent Application No. CN 201620553202.3, filed on Jun. 8, 2016, each of which is incorporated herein by reference in its entirety.

FIELD OF THE DISCLOSURE

The present disclosure relates generally to torque output tools, and more particularly, to an electric drill.

BACKGROUND OF THE DISCLOSURE

Torque output tools, such as an electric drill and an electric screwdriver, generally include a housing, a motor, a transmission mechanism, a gear box and an output shaft. The transmission mechanism is disposed between the motor and the output shaft. The gear box is configured to contain the transmission mechanism. The motor drives the output shaft to rotate through the transmission mechanism so as to output torque. At present, the power tool with a torque adjusting function has become a trend. So, the power tool includes a sleeve disposed outside the gear box. However, how to locate the sleeve in an axial direction is always a difficult technique point. The traditional locating method increases an axial size of the torque output tool, which does not facilitate a miniaturization of the torque output tool.

The statements in this section merely provide background information related to the present disclosure and may not constitute prior art.

SUMMARY

In one aspect of the disclosure, a power tool includes an output shaft for outputting torque, a motor for driving the output shaft to rotate about a first axis, a transmission mechanism for transmitting an output of the motor to the output shaft, a gear box for containing the transmission mechanism, a sleeve for a user to operate so as to adjust a maximum output torque transmitted from the motor to the output shaft, a locating element for limiting an axial position of the sleeve, fastening elements for fixing the locating element to the gear box, and a bearing for supporting the output shaft. The locating element is formed with a containing groove for containing the bearing and locating holes formed on a bottom of the containing groove. The fastening elements are partially embedded in the locating holes.

In another aspect of the disclosure, a power tool includes an output shaft for outputting torque, a motor for driving the output shaft to rotate about a first axis, a transmission mechanism for transmitting an output of the motor to the output shaft, a gear box for containing the transmission mechanism, a sleeve for a user to operate so as to adjust a maximum torque transmitted from the motor to the output shaft, a locating element for limiting an axial position of the sleeve, screws for fixing the locating element to the gear box, and a shaft lock mechanism for locking the rotation of the output shaft. The shaft lock mechanism includes a lock cylinder rotated synchronously with the output shaft, a lock ring surrounding the lock cylinder and being fixed relative to the gear box, and lock pins disposed between the lock cylinder and the lock ring. The lock ring is formed with containing holes. The locating element is formed with locating holes. The screws comprise screw rods and screw heads. The screw rods are partially contained in the locating holes, and the screw heads are contained in the containing holes.

Further areas of applicability will become apparent from the description provided herein. It should be understood that the description and specific examples are intended for purposes of illustration only and are not intended to limit the scope of the present disclosure.

Figure 1:
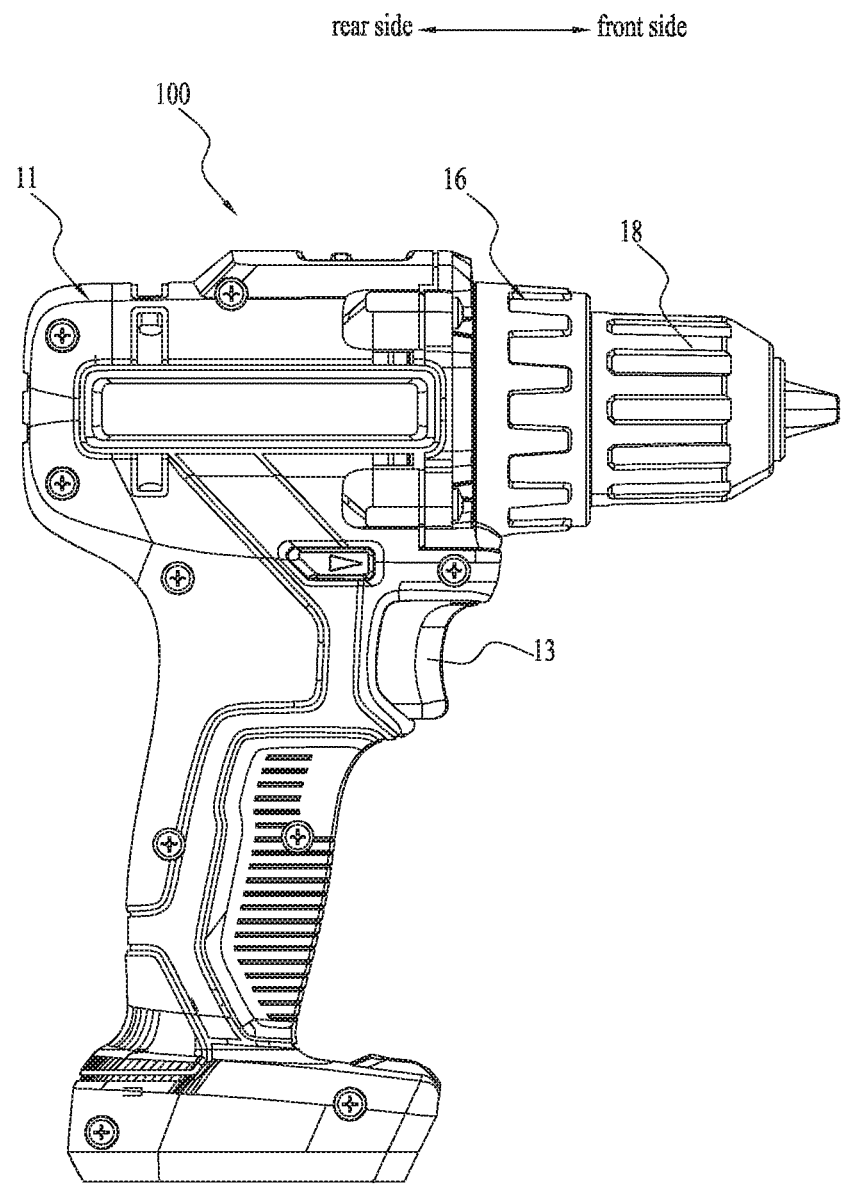
FIG. 1 is a schematic view of an exemplary torque output tool.
Figure 2:
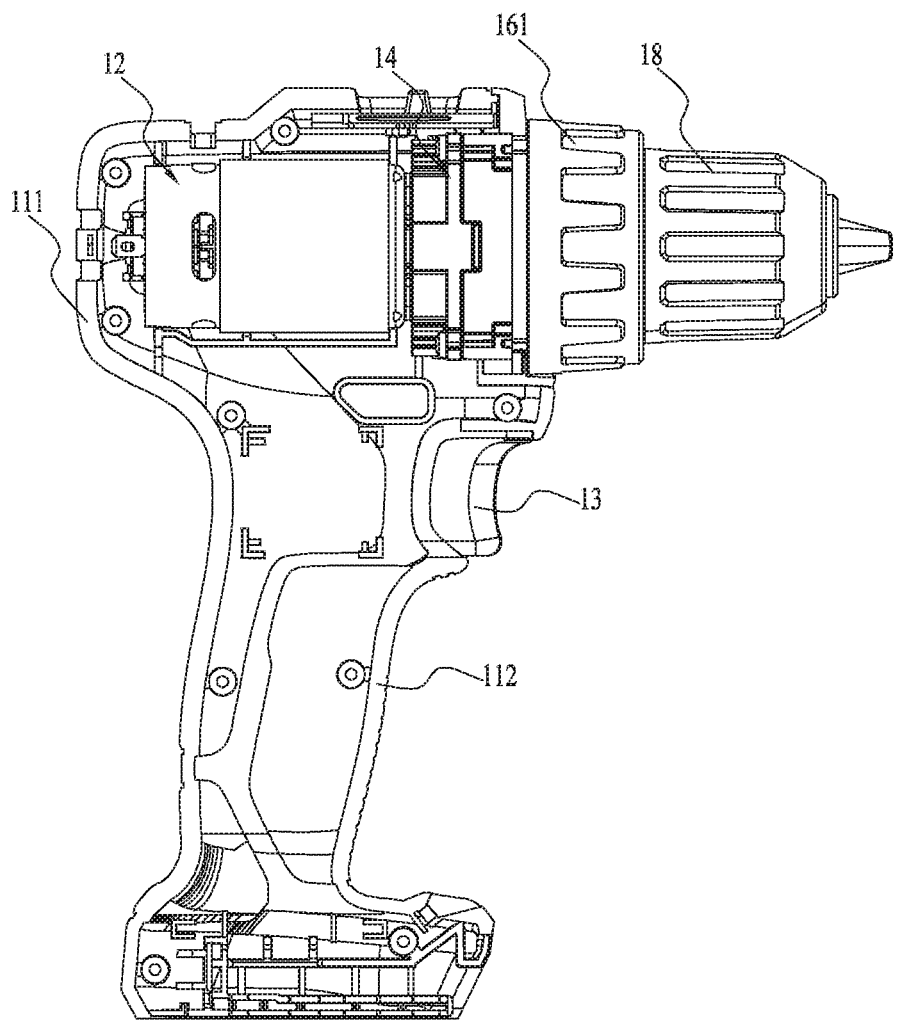
FIG. 2 shows an internal structure of the power tool in FIG. 1.
Figure 3:
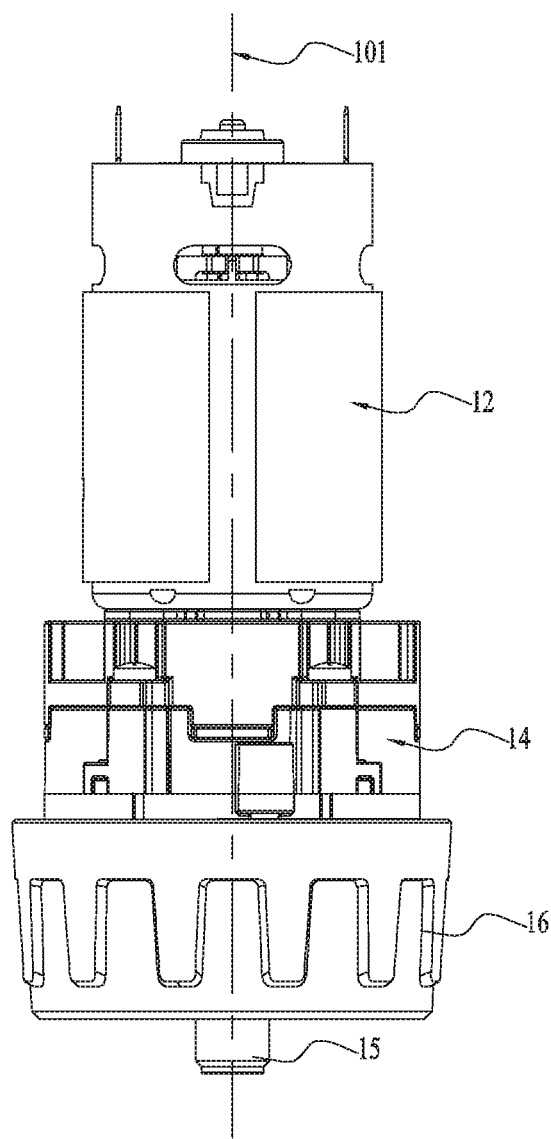
FIG. 3 is a schematic view of a motor, a gear box, a transmission mechanism, a torque adjusting mechanism and an output shaft in FIG. 2.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

The following description of the preferred embodiments is merely exemplary in nature and is in no way intended to limit the invention hereinafter claimed, its application, or uses.

As shown in FIG. 1, a power tool 100, which may be an electric drill, an electric screwdriver, etc., is capable of outputting torque. In a preferred embodiment, the power tool 100 takes a form of an electric drill as an example.

Referring to FIGS. 1-4, the power tool 100 includes a housing 11, a motor 12, a trigger 13, a transmission mechanism 20, a gear box 14, an output shaft 15, a torque adjusting device 16, a shaft lock mechanism 17, a clutch device 18, and a locating element 19. The torque adjusting device 16 includes a sleeve 161 for user operation so as to adjust a maximum output torque transmitted from the motor 12 to the output shaft 15. The clutch device 18 is used to clamp an attachment such as a drill bit. The locating element 19 is used to limit an axial position of the sleeve 161.

The housing 11 is formed with a containing portion 111 and a handle portion 112. The containing portion 111 is used to contain the motor 12. The handle portion 112 is for the user to grip. The housing 11, the sleeve 161 and the clutch device 18 collectively constitute a shape of the power tool 100. The motor 12 disposed within the housing 11 is used to drive the output shaft 15 to rotate about a first axis 101 relative to the housing 11. The motor 12 includes a drive shaft 121 for outputting power. For the electric drill, the motor 12 can be an electric motor, and the drive shaft 121 is a motor shaft. The trigger 13 is mounted on the housing 11 and used to activate the motor 12 when it is operated by the user, so that the power tool 100 is powered on.

In order to illustrate the embodiments conveniently, an axial direction, a circumferential direction and a radial direction which are centered on the first axis 101 are defined, which can be understood by the person having ordinary skill in the art. The axial direction not only includes the direction of the first axis 101, but also includes the directions substantially parallel to the first axis 101. Furthermore, one side of the power tool 100 which faces the clutch device 18 along the axial direction is defined as a front side, and the other side of the power tool 100 which is far from the clutch device 18 is defined as a rear side.

Figure 4:
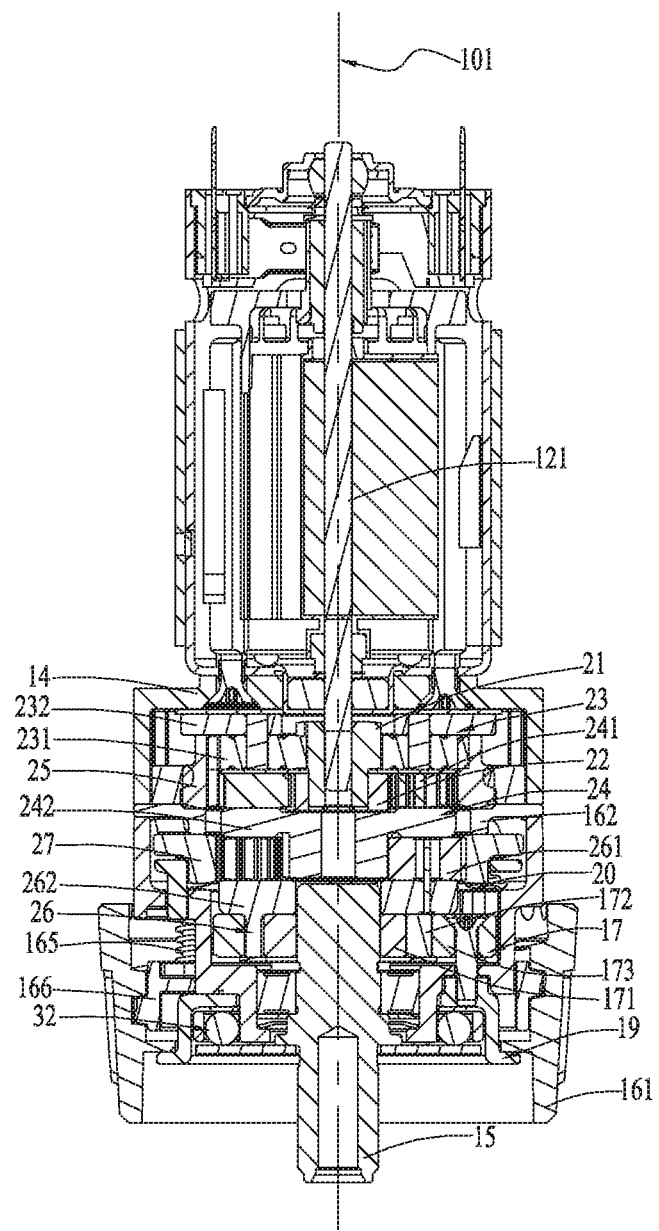
FIG. 4 is a section view of the motor, the gear box, the transmission mechanism, the torque adjusting mechanism and the output shaft in FIG. 2.
Figure 5:
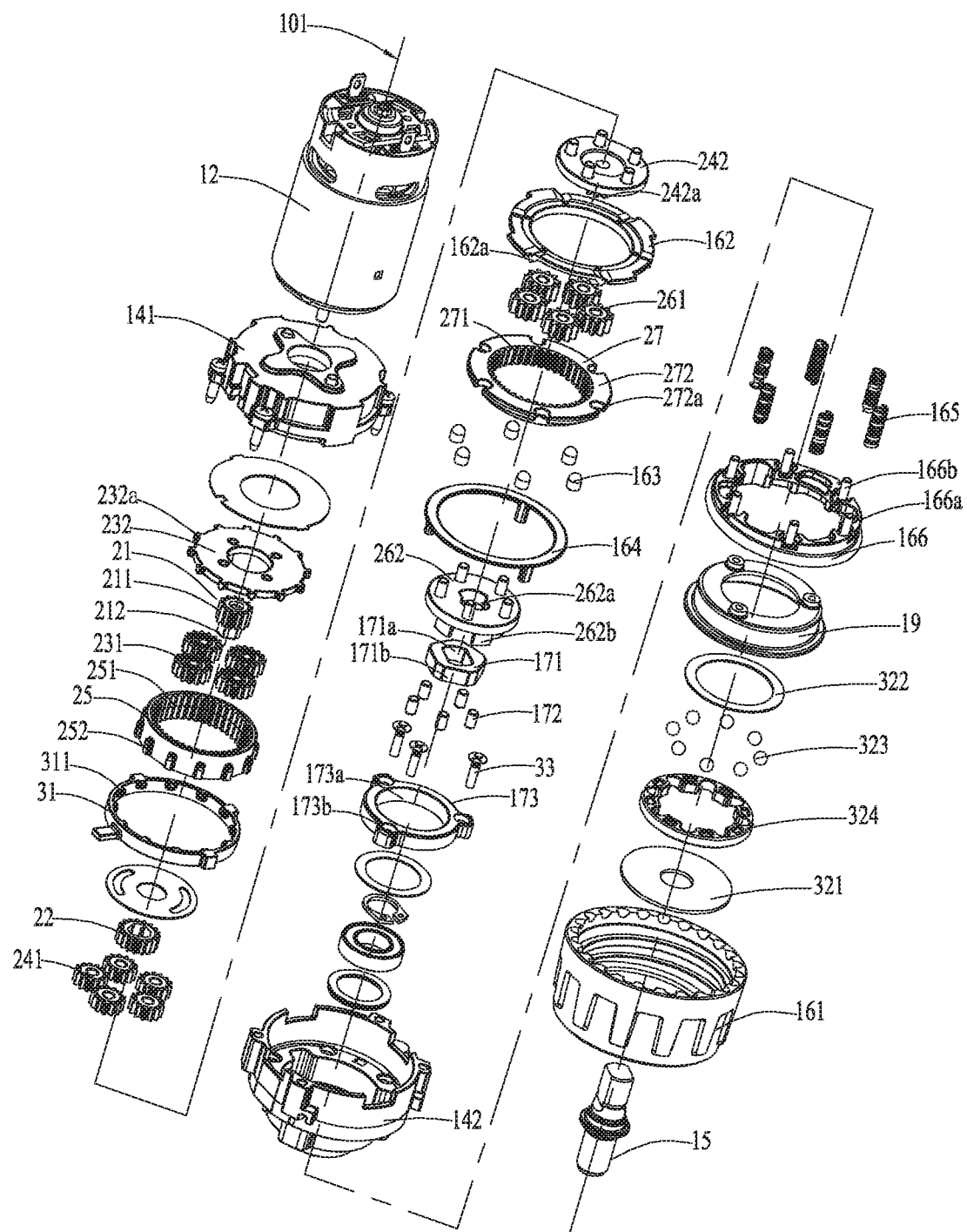
FIG. 5 is an exploded view of the structure in FIG. 3.
Figure 6:
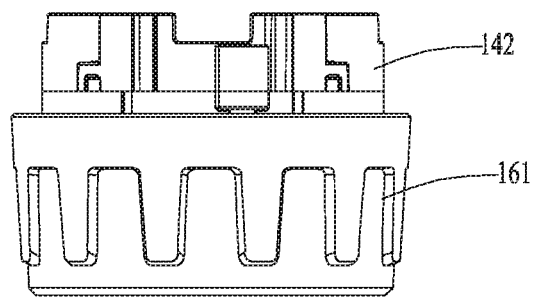
FIG. 6 is a schematic view of a front casing, a sleeve, a lock ring, fastening elements, a locating element and a bearing in FIG. 3.
Figure 7:
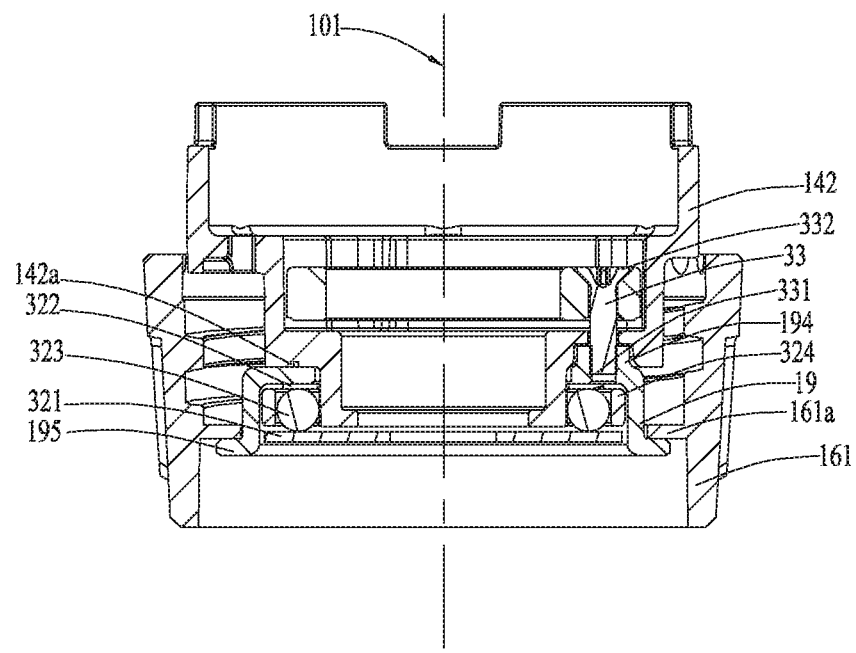
FIG. 7 is a section view of the front casing, the sleeve, the lock ring, the fastening elements, the locating element and the bearing in FIG. 3.
Figure 8:
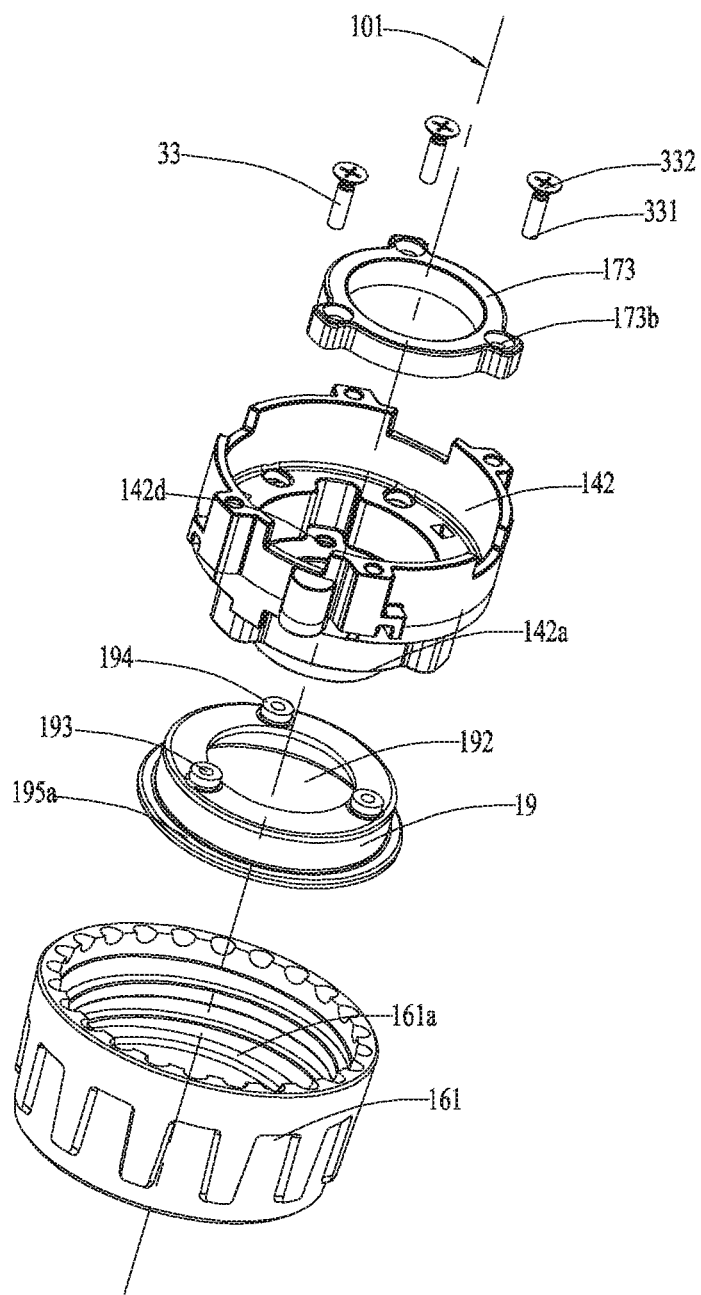
FIG. 8 is an exploded view of the structure in FIG. 7.
Figure 9:
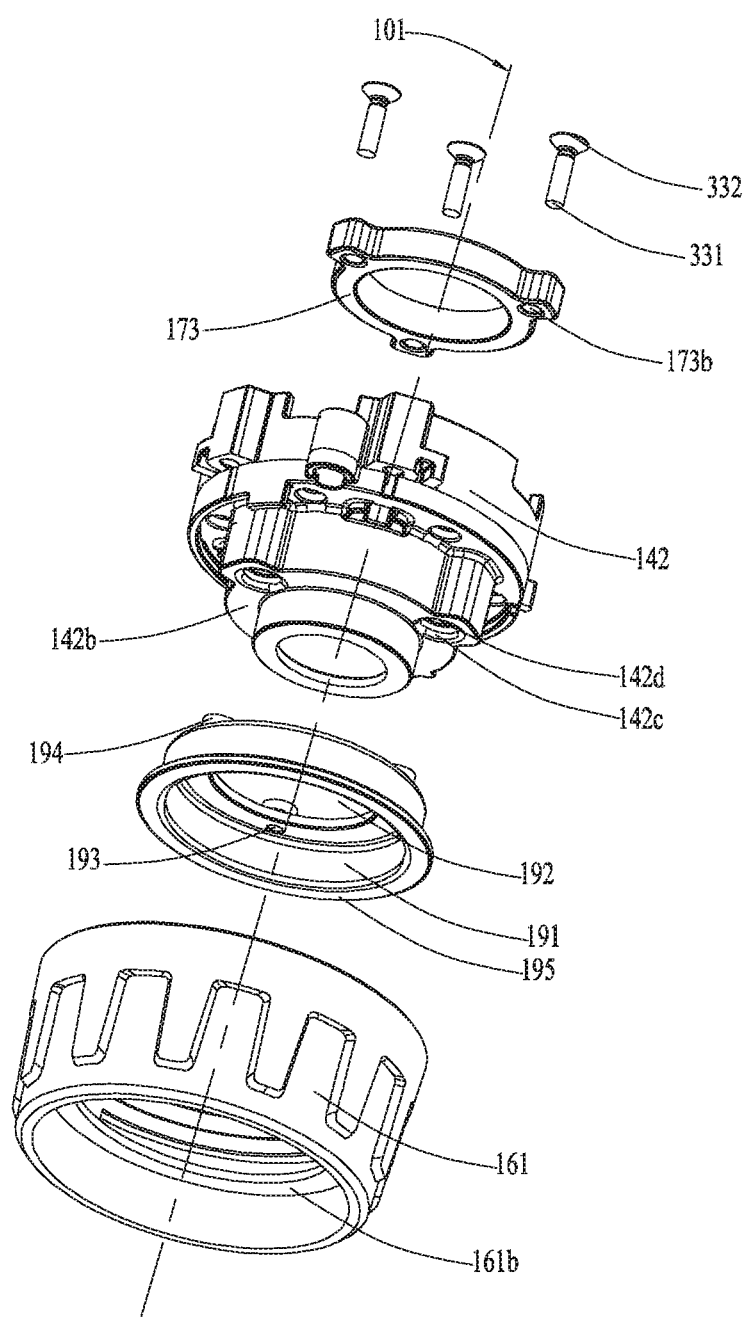
FIG. 9 is another exploded view of the structure in FIG. 7.

The transmission mechanism 20 is configured to transmit the output of the motor 12 to the output shaft 15, so that the output shaft 15 can be driven to rotate about the first axis 101. The gear box 14 is configured to contain the transmission mechanism 20. The output shaft 15 is configured to be driven by the transmission mechanism 20 so as to output torque. Referring to FIGS. 4-5, the transmission mechanism 20 includes a first sun gear 21, a second sun gear 22, a first planetary gear set 23, a second planetary gear set 24, and a first ring gear 25. The first ring gear 25 is capable of rotating about the first axis 101 relative to the housing 11 and is fixed in the axial direction within the gear box 14. The gear box 14 is fixedly disposed within the housing 11 and includes a rear casing 141 and a front casing 142 which can be coupled with each other. The transmission mechanism 20 is disposed in an area surrounded by the rear casing 141 and the front casing 142.

The first sun gear 21 and the second sun gear 22 are able to rotate with the drive shaft 121 respectively. The first sun gear 21 includes an engaging portion 211 and an extending portion 212 which are formed at different axial positions thereof. The engaging portion 211 is formed with engaging teeth for transmitting power. The extending portion 212 is used to mount the second sun gear 22. The second sun gear 22 is mounted on the extending portion 212 of the first sun gear 21 and able to rotate synchronously with the first sun gear 21. The second sun gear 22 is also formed with engaging teeth for transmitting power which have the same teeth profile as the engaging teeth of the first sun gear 21. The second sun gear 22 has a radius of addendum which is greater than that of the first sun gear 21. Thus, the second sun gear 22 has more teeth than the first sun gear 21.

The first planetary gear set 23 includes a first planet gear 231 and a first planet carrier 232. The first planet gear 231 is rotatably mounted on the first planet carrier 232 and engaged with the engaging portion 211 of the first sun gear 21. The second planetary gear set 24 includes a second planet gear 241 and a second planet carrier 242. The second planet gear 241 is rotatably mounted on the second planet carrier 242 and engaged with the second sun gear 22. The first ring gear 25 is formed with inner teeth 251 on its inner circumference. The first planet gear 231 and the second planet gear 241 are disposed in the first ring gear 25 and able to engage with the first ring gear 25 at the same time.

The first planet carrier 232 and the first ring gear 25 are rotatably disposed within the gear box 14. The first planet carrier 232 is partially located between the motor 12 and the first planet gear 231 in the axial direction. The second planet carrier 242 is formed with an output portion 242a for outputting power to the output shaft 15. The transmission mechanism 20 further includes a third planetary set 26 and a second ring gear 27. The third planetary set 26 is disposed between the second planetary set 24 and the output shaft 15 and includes a third planet gear 261 and a third planet carrier 262.

When the rotation of the first ring gear 25 relative to the housing 11 is locked, the rotation of the first planet carrier 232 relative to the housing 11 is released. When the motor 12 is activated, the drive shaft 121 transmits the power to the first sun gear 21, and then the first sun gear 21 transmits the power to the first planet gear 231. Because the first ring gear 25 is fixed, the first planet gear 231 transmits the power to the first planet carrier 232. The first planet carrier 232 just idles and does not output power because it is not connected with the output mechanism. Meanwhile, the drive shaft 121 transmits power to the second sun gear 22, and then the second sun gear 22 transmits power to the second planet gear 241. Because the first ring gear 25 is fixed, the second planet gear 241 transmits the power to the second planet carrier 242. So, among the first and second planetary sets 23, 24, only the second planetary set 24 has the effect of slowing down at this moment. Thus, the output portion 242a of the second planet carrier 242 outputs at a high speed, that is, the drive shaft 121 and the output shaft 15 have a first transmission ratio there between. Whereas, when the rotation of the first planet carrier 232 relative to the housing 11 is locked, the rotation of the first ring gear 25 relative to the housing 11 is released. When the motor 12 is activated, the drive shaft 121 transmits the power to the first sun gear 21, and then the first sun gear 21 transmits the power to the first planet gear 231. Because the first planet carrier 232 is locked, the first planet gear 231 transmits the power to the first ring gear 25, so that the first ring gear 25 is rotated. Meanwhile, the drive shaft 121 transmits the power to the second sun gear 22. At this moment, for the second planet gear 21, it and the second sun gear 22 and the first ring gear 25 constitute a double input transmission system. So, the output portion 242a of the second planet carrier 242 outputs at a low speed, that is, the drive shaft 121 and the output shaft 15 have a second transmission ratio lager than the first transmission ratio there between.

In order to adjust the transmission mechanism 20 to change the transmission ratio between the drive shaft 121 and the output shaft 15, the power tool 100 further includes an adjusting element 31. Specifically, the adjusting element 31 is configured to engage with the first ring gear 25 and the first planet carrier 232, so it can lock the rotation of the first ring gear 25 or the rotation of the first planet carrier 232 relative to the gear box 14. Thus, the drive shaft 121 and the output shaft 15 have the first transmission ratio and the second transmission ratio there between.

The adjusting element 31 is formed with an adjusting portion 311. The first ring gear 25 is formed with a peripheral structure 252. The first planet carrier 232 is formed with a limiting portion 232a. The adjusting portion 311 is able to engage with the peripheral structure 252 and also able to engage with the limiting portion 232a. The adjusting element 31 can move along the axial direction. When the adjusting element 31 is moved to a position to make the adjusting portion 311 engage with the peripheral structure 252, the rotation of the first ring gear 25 relative to the gear box 14 is locked, and the rotation of the first planet carrier 232 relative to the gear box 14 is released. Whereas, when the adjusting element 31 is moved to another position to make the adjusting portion 311 engage with the limiting portion 232a, the rotation of the first planet carrier 232 relative to the gear box 14 is locked, and the rotation of the first ring gear 25 relative to the gear box 14 is released.

The torque adjusting device 16 further includes a stop ring 162, stop pins 163, a washer 164, compressed springs 165 and a spiral ring 166. The stop ring 162 is fixedly disposed within the gear box 14 and located between the adjusting element 31 and the second ring gear 27. The stop ring 162 is formed with a plurality of raising portions 162a on its side facing the second ring gear 27. The second ring gear 27 includes a tooth ring portion 271 and a flange portion 272. The tooth ring portion 271 is configured to engage with the third planet gear 261. The flange portion 272 is formed on an end of the tooth ring portion 271 which is close to the stop ring 162. The flange portion 272 is formed with a plurality of gaps 272a on its edge. The number of the gaps 272 can be the same as the number of the raising portions 162a on the stop ring 162, for example, the number can be six. The gaps 272a go through the flange portion 272 along the axial direction. The number of the stop pins 163 is the same as the number of the gaps 272a. The stop pins 163 are received in the gaps 272a. The stop pins 163 have an axial length which is greater than the axial length of the gaps 272a. That is, the stop pins 163 are able to extend out of the gaps 272a and engage with the raising portions 162a of the stop ring 162. The washer 164 is used to press against the stop pins 163 and located on an end of the stop pins 163 which is farthest from the stop ring 162. The compressed springs 165 are mounted on the spiral ring 166. The spiral ring 166 includes a spiral portion 166a and mounting pins 166b. The mounting pins 166b are used to mount the compressed springs 165. The spiral portion 166a is used to engage with the sleeve 161. After the compressed springs 165 are mounted on the mounting pins 166b, the two ends of the compressed springs 165 contact with the washer 164 and the spiral ring 166 respectively. The spiral ring 166 is slidably connected with the housing 11 along the axial direction. The sleeve 161 is rotatably connected with the housing 11 and fixed in the axial direction.

The sleeve 161 can be rotated by the user so as to set the maximum output torque. The rotation of the sleeve 161 relative to the housing 11 can drive the spiral spring 166 to move backward a certain distance along the axial direction relative to the housing 11. The spiral spring 166 compresses the compressed springs 165, and the compressed springs 165 generate corresponding elastic force according to the compressed displacement. The elastic force is transmitted to the stop pins 163 through the washer 164. The stop pins 163 press against the raising portions 162a of the stop ring 162 under the action of the elastic force. And the stop pins 163 are located in the gaps 272a of the second ring gear 27, so the second ring gear 27 cannot rotate with the third planet gear 261 and keeps a stationary state. At this moment, the motor 12 can transmit power to the output shaft 15 through the first, second and third planetary sets 23, 24, 26, and the output shaft 15 drives the clutch device 18 to rotate. When the output torque of the output shaft 15 is greater than the set maximum output torque, the rotation force acted on the second ring gear 27 makes the stop pins 163 located in the gaps 272a able to overcome the elastic force of the compressed springs 165 and go over the raising portions 162a of the stop ring 162. So, the second ring gear 27 is able to rotate relative to the housing 11. At this moment, the third planetary set 26 does not output torque to the output shaft 15, and the torque output from the motor 12 to the output shaft 15 is interrupted.

The shaft lock mechanism 17, which is used to lock the rotation of the output shaft 15, includes a lock cylinder 171, lock pins 172 and a lock ring 173. The third planet carrier 262 is formed with a drive hole 262a which can drive the output shaft 15 to rotate. The drive hole 262a allows the output shaft 15 to rotate within a certain angle range relative to the third planet carrier 262. The third planet carrier 262 is provided with several paddles 262b. The paddles 262b are arranged around the drive hole 262a. The lock cylinder 171 is surrounded by the paddles 262b. The lock cylinder 171 is formed with a flat hole 171a allowing the output shaft 15 to pass through. The flat hole 171a makes the lock cylinder 171 rotate synchronously with the output shaft 15. The lock cylinder 171 is further formed with several working planes 171b on its periphery. The lock ring 173 is disposed around the lock cylinder 171 and formed with a complete cylindrical surface 173a on its inner ring. The lock pins 172 are cylindrical pins, which are disposed between the working planes 171b of the lock cylinder 171 and the cylindrical surface 173a of the lock ring 173. Each working plane 171b projects into a line on a plane substantially perpendicular to the first axis 101. In the plane, a distance between the working planes 171b of the lock cylinder 171 and the cylindrical surface 173a of the lock ring 173 is firstly increased and then decreased from one end to another end of the line. So, when the lock pins 172 move close to the end of the line, the rotation of the lock cylinder 171 and the output shaft 15 are locked. Whereas, when the lock pins 172 move far from the end of the line, the output shaft 15 can rotate freely so as to output torque.

In order to support the output shaft 15, the power tool 100 further includes a bearing 32. In this embodiment, the bearing 32 is disposed outside the gear box 14. The bearing 32 can be an end bearing. Referring to FIGS. 4-7, the bearing 32 includes a front end cap 321, a rear end cap 322, rolling elements 323 and a support frame 324. The front end cap 321 contacts with the output shaft 15, and the rear end cap 322 contacts with an outer wall of the front casing 142 of the gear box 14. The support frame 324 is configured to support the rolling elements 323. The support frame 324 and the rolling elements 323 constitute a whole which is disposed between the front end cap 321 and the rear end cap 322. The rolling elements 323 contacts with the front end cap 321 and the rear end cap 322 respectively in the axial direction, so that the rear end cap 322 can be rotated relative to the front end cap 321.

The locating element 19 is used to limit the axial position of the sleeve 161. Specifically, the locating element 19 is used to limit the sleeve 161 to move forward. In order to fix the locating element 19 to the housing 11, the power tool 100 further includes fastening elements 33. The fastening elements 33 are able to fasten the locating element 19 to the front casing 142 of the gear box 14.

Referring to FIGS. 4-9, the locating element 19 is disposed outside the gear box 14 and located on a front side of the front casing 142 of the gear box 14.

The locating element 19 is formed with a containing groove 191 for containing the bearing 32. The containing groove 191 has a circular bottom and is formed with a central hole 192 at the bottom. The output shaft 15 passes through the central hole 192. The rear end cap 322 of the bearing 32 contacts with the bottom of the containing groove 191. The containing groove 191 is further formed with a locating hole 193 at the bottom. The number of the locating hole 193 can be more than one. The locating holes 193 are arranged around the central hole 192. The locating element 19 is provided with locating bulges 194 facing the gear box 14 along the axial direction. The number of the locating bulges 194 is corresponding to the number of the locating holes 193. The locating holes 193 go through the locating bulges 194 and the bottom of the containing groove 191, so that the fastening elements 33 can fix the locating element 19 to the gear box 14 by embedding in the locating holes 193.

The locating element 19 is also located in a space surrounded by the sleeve 161. The sleeve 161 is provided with a first limiting portion 161a extending inwardly. The first limiting portion 16a is formed with a first limiting plane 161b which is substantially perpendicular to the first axis 101. The locating element 19 is provided with a second limiting portion 195 extending outwardly which is able to engage with the first limiting portion 16a. The second limiting portion 195 of the locating element 19 is formed on an end of the wall of the containing groove which is far from the bottom. The second limiting portion 195 is formed with a second limiting plane 195a which is substantially perpendicular to the first axis 101. The second limiting portion 195 contacts with the front side of the first limiting plane 161b so as to limit the axial position of the sleeve 161.

The front casing 142 of the gear box 14 is provided with an annular step structure 142a. The locating element 19 is disposed at the annular step structure 142a. The annular step structure 142a includes an annular step surface 142b which is substantially perpendicular to the first axis 101. The annular step surface 142b is formed with recesses 142c allowing the locating bulges 194 to embed. The recesses 142c are formed with through holes 142d on the bottom which are able to communicate with the locating holes 193. The through holes 142d go through the front casing 142 of the gear box 14 along the axial direction.

The lock ring 173 is fixedly disposed in the gear box 14. The position of the lock ring 173 corresponds to the position of the step structure 142a of the front casing 142. The lock ring 173 is formed with containing holes 173b extending along the axial direction which are communicated with the through holes 142d. Thus, the containing holes 173b of the lock ring 173, the through holes 142d of the gear box 14 and the locating holes 193 of the locating element 19 are disposed on the same axis direction which is substantially parallel to the first axis 101, and the three holes 173b, 142d, 193 constitute a whole which goes through the lock ring 173, the gear box 14 and the locating element 19 in the axis direction.

The fastening elements 33 are able to pass through the containing holes 173b of the lock ring 173 and the through holes 142d of the gear box 14 in turn, and then embed in the locating holes 193 of the locating element 19, so that the locating element 19 is fixed to the gear box 14. Each fastening element 33 includes a first end 331 and a second end 332 in the axial direction. The first ends 331 are contained in the locating holes 193 and do not extend forward and out of the locating holes 193. The second ends 332 are contained in the containing holes 173b and do not extend backward and out of the containing holes 173b. That is, the first ends 331 of the fastening elements 33 do not protrude forward and out of the locating holes 193, and the second ends 332 of the fastening elements 33 do not protrude backward and out of the containing holes 173b. So, the axial size of the fastening elements 33 is less than the sum of the axial sizes of the containing holes 173b, the through holes 142d and the locating holes 193. Because the first ends 331 of the fastening elements 33 do not extend forward and out of the locating holes 193, they do not extend forward and into the containing groove 191. So, the containing space formed by the containing groove 191 and the fastening elements 33 are staggered in the axial direction.

More specifically, the fastening elements 33 can be screws. The number of the screws is the same as the number of the locating holes 193. Each screw includes a screw rod and a screw head. A free end of the screw rod forms the first end 331 of the fastening element 33. The screw head forms the second end 332 of the fastening element 33. The screw rods are partially contained in the locating holes 193. The screw heads are contained in the containing holes 173b. Correspondingly, the locating holes 193 can be screw holes which are able to engage with the screw rods. Further, the screws can be sunk screws. So, the screw heads of the screws are contained in the containing holes 173b of the lock ring 173. The power tool 100 is not needed to reserve a space for containing the screw heads in the axial direction. And, the axial size of the whole power tool 100 can be reduced, which facilitates miniaturization of the power tool 100.

Otherwise, it can be understood for those skilled in the art that, it is not limited to use the lock ring 173 to form the containing holes 173b for partially containing the fastening elements 33. Actually, any internal component disposed in the gear box 14 can form the containing holes 173b for containing the fastening elements 33, which can attain the goal of reducing size as well.

The above illustrates and describes basic principles, main features and advantages of the invention hereinafter claimed. Those skilled in the art should appreciate that the above embodiments do not limit the present invention in any form. Technical solutions obtained by equivalent substitution or equivalent variations all fall within the scope of the claimed invention.

What is claimed is:

1. A power tool, comprising:
   an output shaft for outputting torque;
   a motor for driving the output shaft to rotate about a first axis;
   a transmission mechanism for transmitting an output of the motor to the output shaft;
   a gear box for containing the transmission mechanism;
   a sleeve for a user to operate so as to adjust a maximum output torque transmitted from the motor to the output shaft;
   a locating element for limiting an axial position of the sleeve;
   fastening elements for fixing the locating element to the gear box; and
   a bearing for supporting the output shaft,
   wherein the locating element is formed with a containing groove for containing the bearing and locating holes positioned on a bottom of the containing groove,
   wherein the fastening elements are at least partially embedded in the locating holes, and
   wherein the locating element is disposed in the sleeve, the sleeve is provided with a first limiting portion extending inwardly, the locating element is provided with a second limiting portion extending outwardly, and the second limiting portion is capable of engaging with the first limiting portion so as to limiting the axial position of the sleeve.

2. The power tool of claim 1, wherein a containing space formed by the containing groove and the fastening elements are staggered in an axial direction.

3. The power tool of claim 1, further comprising an internal component disposed in the gear box, wherein the internal component is formed with containing holes and the fastening elements are at least partially contained in the containing holes.

4. The power tool of claim 3, wherein each fastening element has a first end and a second end in an axial direction, the first ends and the second ends are contained in the locating holes and the containing holes respectively, the first ends don't extend out of the locating holes, and the second ends do not extend out of the containing holes.

5. The power tool of claim 3, wherein the fastening elements are screws comprising screw rods and screw heads, the screw rods are partially contained in the locating holes, and the screw heads are contained in the containing holes.

6. The power tool of claim 3, wherein the locating element is disposed outside the gear box and formed with locating bulges facing the gear box in an axial direction, the locating holes go through the locating bulges and the bottom of the containing groove, the gear box is formed with recesses allowing the locating bulges to embed therein, the recesses are formed with through holes on the bottom which are capable of communicating with the locating holes, and the fastening elements passes through the through holes.

7. The power tool of claim 6, wherein the fastening elements have an axial size which is less than a sum of axial sizes of the containing holes, the through holes and the locating holes.

8. The power tool of claim 3, further comprising a shaft lock mechanism for locking the rotation of the output shaft, wherein the shaft lock mechanism comprises a lock cylinder rotated synchronously with the output shaft, a lock ring surrounding the lock cylinder and being fixed relative to the gear box, and lock pins disposed between the lock cylinder and the lock ring, and wherein the internal component is the lock ring.

9. A power tool, comprising:
an output shaft for outputting torque;
a motor for driving the output shaft to rotate about a first axis;
a transmission mechanism for transmitting an output of the motor to the output shaft;
a gear box for containing the transmission mechanism;
a sleeve for a user to operate so as to adjust a maximum torque transmitted from the motor to the output shaft;
a locating element for limiting an axial position of the sleeve;
screws for fixing the locating element to the gear box; and
a shaft lock mechanism for locking the rotation of the output shaft;
wherein the shaft lock mechanism comprises a lock cylinder rotated synchronously with the output shaft, a lock ring surrounding the lock cylinder and being fixed relative to the gear box, and lock pins disposed between the lock cylinder and the lock ring; and
wherein the lock ring is formed with containing holes, the locating element is formed with locating holes, the screws comprise screw rods and screw heads, the screw rods are partially contained in the locating holes, and the screw heads are contained in the containing holes.

10. The power tool of claim 9, wherein the locating element is disposed outside the gear box and formed with locating bulges facing the gear box in an axial direction, the locating holes go through the locating bulges, the gear box is formed with recesses allowing the locating bulges to embed therein, the recesses are formed with through holes on the bottom which are capable of communicating with the locating holes, and the screws passes through the through holes.

11. The power tool of claim 10, wherein the screws have an axial size which is less than a sum of axial sizes of the containing holes, the through holes and the locating holes.

* * * * *